US011415220B2

(12) United States Patent
Kittaka et al.

(10) Patent No.: US 11,415,220 B2
(45) Date of Patent: Aug. 16, 2022

(54) TRANSMISSION DEVICE OF SADDLE RIDING VEHICLE

(71) Applicant: HONDA MOTOR CO., LTD., Tokyo (JP)

(72) Inventors: Eiji Kittaka, Tokyo (JP); Takashi Kudo, Tokyo (JP); Hiroyuki Kojima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 291 days.

(21) Appl. No.: 16/920,182

(22) Filed: Jul. 2, 2020

(65) Prior Publication Data
US 2021/0010592 A1 Jan. 14, 2021

(30) Foreign Application Priority Data

Jul. 12, 2019 (JP) .............................. JP2019-130373

(51) Int. Cl.
*F16H 63/18* (2006.01)
*B62M 11/06* (2006.01)
*F16H 3/08* (2006.01)

(52) U.S. Cl.
CPC .............. *F16H 63/18* (2013.01); *B62M 11/06* (2013.01); *F16H 3/08* (2013.01)

(58) Field of Classification Search
CPC ............ F16H 63/18; F16H 3/08; B62M 11/06
USPC .................................. 74/337.5, 335
See application file for complete search history.

(56) References Cited

U.S. PATENT DOCUMENTS

| 7,146,871 | B2* | 12/2006 | Ozaki | F16H 61/32 |
| | | | | 74/335 |
| 8,327,970 | B2* | 12/2012 | Furuse | B62M 25/08 |
| | | | | 180/336 |
| 8,397,596 | B2* | 3/2013 | Tomoda | F16H 63/18 |
| | | | | 74/337.5 |
| 10,550,939 | B2* | 2/2020 | Miyachi | B62M 25/02 |
| 2009/0249914 | A1* | 10/2009 | Kashiwai | F16H 63/30 |
| | | | | 280/63 |
| 2011/0226080 | A1* | 9/2011 | Ieda | F16H 63/14 |
| | | | | 74/473.36 |

FOREIGN PATENT DOCUMENTS

| JP | 2004-231166 | 8/2004 |
| JP | 2008-190646 A | 8/2008 |
| JP | 2011-106166 | 6/2011 |

(Continued)

OTHER PUBLICATIONS

Japanese Office Action with English translation dated Apr. 27, 2021, 9 pages.

(Continued)

*Primary Examiner* — Ha Dinh Ho
(74) *Attorney, Agent, or Firm* — Rankin, Hill & Clark LLP

(57) ABSTRACT

In a transmission device of a saddle riding vehicle arranged in the saddle riding vehicle, including a transmission and an actuator, the transmission including a shift drum, the shift drum rotating and changing shift position, the actuator rotatively driving the shift drum, and controlling the rotation angle of the shift drum by restricting rotation of the shift drum by cogging torque of the actuator, a pattern of an output of the actuator in changing the shift position by one stage is variable.

5 Claims, 8 Drawing Sheets

(56) References Cited

FOREIGN PATENT DOCUMENTS

| | | |
|---|---|---|
| JP | 2012-107706 A | 6/2012 |
| JP | 2016-089716 | 5/2016 |
| JP | 2017-155839 | 9/2017 |
| JP | 2018-173149 A | 11/2018 |

OTHER PUBLICATIONS

Indian Office Action dated Dec. 15, 2021, Application No. 202014028819, 5 pages.
Japanese Office Action dated Nov. 9, 2021, English translation included, 7 pages.

* cited by examiner

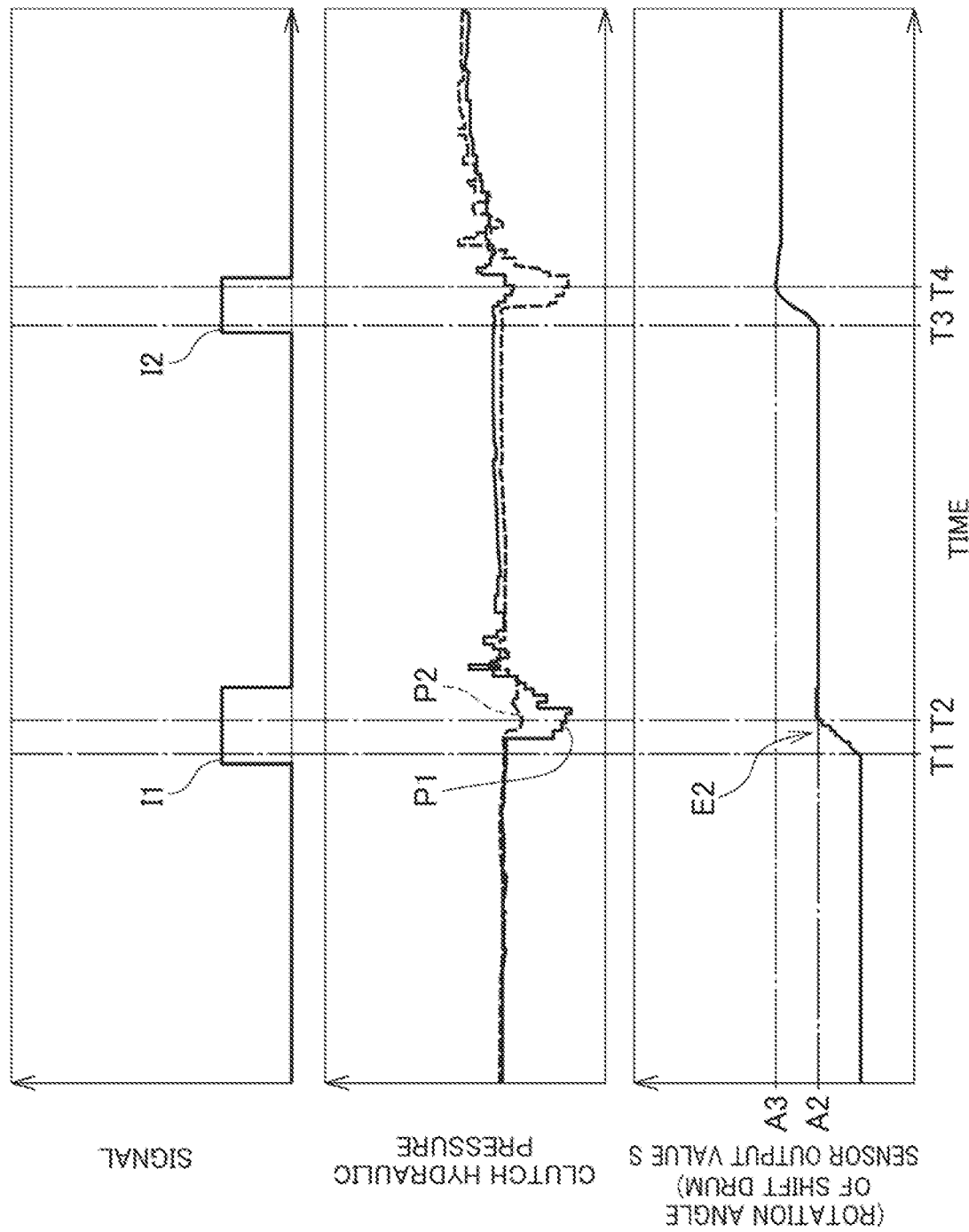

TRANSMISSION DEVICE OF SADDLE RIDING VEHICLE

INCORPORATION BY REFERENCE

The present application claims priority under 35 U.S.C. § 119 to Japanese Patent Application No. 2019-130373 filed on Jul. 12, 2019. The content of the application is incorporated herein by reference in its entirety.

TECHNICAL FIELD

The present invention relates to a transmission device of a saddle riding vehicle.

BACKGROUND ART

As a prior art, in a twin clutch type transmission device, there has been known one allowing so-called seamless transmission of executing speed shift without disconnecting the clutch (refer to Patent Literature 1 for example). According to Patent Literature 1, seamless transmission is allowed by devising the shape of the lead groove of the shift drum. According to seamless transmission, speed shift can be executed quickly.

CITATION LIST

Patent Literature

[Patent Literature 1] JP-A No. 2017-155839

SUMMARY OF INVENTION

Technical Problem

However, according to the transmission device of the saddle riding vehicle of the prior art described above, since the lead groove of the shift drum is made to have an exclusive pattern for seamless transmission, it is hard to execute normal speed shift that gives priority to quietness and reduction of the speed shift shock. Therefore, it is desirable to be capable of changing the characteristic of normal speed shift and the characteristic of such speed shift different from normal speed shift as seamless transmission for example according to the condition of the saddle riding vehicle.

The present invention has been achieved in view of such circumstances as described above, and its object is to allow to change the characteristic of speed shift in a transmission device of a saddle riding vehicle.

Solution to Problem

In a transmission device of a saddle riding vehicle, the transmission device being arranged in the saddle riding vehicle, including a transmission (41) and an actuator (72), the transmission (41) including a shift drum (71), the shift drum (71) rotating and changing shift position, the actuator (72) rotatively driving the shift drum (71), and controlling the rotation angle of the shift drum (71) by restricting rotation of the shift drum (71) by cogging torque of the actuator (72), a pattern of an output of the actuator (72) in changing the shift position by one stage is variable.

Further, in the configuration described above, it is also possible that an occupant can optionally change the pattern of an output of the actuator (72).

Further, in the configuration described above, it is also possible that the shift drum (71) includes lead grooves (71a to 71d) extending in the rotation direction of the shift drum (71), speed shift being executed by shifters (74 to 77), the shifters (74 to 77) moving along the lead grooves (71a to 71d), the lead grooves (71a to 71d) include intermediate positions allowing the shifters (74 to 77) to be positioned at a position different from that before speed shift and that after speed shift in changing the shift position by one stage, a first clutch (93) and a second clutch (94) are provided, the first clutch (93) switching transfer of power to a part of the plural shift positions, the second clutch (94) switching transfer of power to the other part of the plural shift positions, both of the shift positions before the speed shift and after the speed shift are established and power is transferred to the shift position before the speed shift by that one of the first clutch (93) and the second clutch (94) is connected at the intermediate position, and the actuator (72) has a first output pattern (E1) and a second output pattern (E2), the first output pattern (E1) allowing rotation of the shift drum (71) to stop once at the intermediate position, the second output pattern (E2) allowing the shift position to be changed by one stage skipping over the intermediate position.

Further, in the configuration described above, it is also possible that, when the actuator (72) is to execute outputting by the second output pattern (E2), a clutch corresponding to the shift position after the speed shift out of the first clutch (93) and the second clutch (94) is made to be in a connected state from start to finish of speed shift in changing the shift position by one stage.

Further, in the configuration described above, it is also possible that a clutch corresponding to the shift position before the speed shift out of the first clutch (93) and the second clutch (94) is disconnected in changing the shift position by one stage.

Advantageous Effects of Invention

The transmission device of the saddle riding vehicle is arranged in the saddle riding vehicle and includes the transmission and the actuator, the transmission including the shift drum, the shift drum rotating and changing shift position, the actuator rotatively driving the shift drum, and a pattern of an output of the actuator in changing the shift position by one stage is variable.

According to this configuration, since the pattern of an output of the actuator is variable while employing a single structure of the transmission (the structure of the shift drum having a single shape for example), the pattern of rotation of the shift drum can be changed only by changing the pattern of the output of the actuator, and the characteristic of the speed shift of the transmission device can be changed.

Further, in the configuration described above, it is also possible that an occupant can optionally change the pattern of the output of the actuator.

According to this configuration, the characteristic of the speed shift can be changed according to a request of the occupant.

Further, in the configuration described above, it is also possible that the shift drum includes the lead grooves extending in the rotation direction of the shift drum, speed shift being executed by the shifters, the shifters moving along the lead grooves, the lead grooves include the intermediate positions allowing the shifters to be positioned at a position different from that before speed shift and that after speed shift in changing the shift position by one stage, the first clutch and the second clutch are provided, the first clutch switching transfer of power to a part of the plural shift positions, the second clutch switching transfer of power to the other part of the plural shift positions, both of the shift positions before the speed shift and after the speed shift are established and power is transferred to the shift position before the speed shift by that one of the first clutch and the second clutch is connected at the intermediate position, and the actuator has the first output pattern and the second output pattern, the first output pattern allowing rotation of the shift drum to stop once at the intermediate position, the second output pattern allowing the shift position to be changed by one stage skipping over the intermediate position.

According to this configuration, the characteristic of the speed shift can be changed by changing a way of rotating the shift drum by the first output pattern and the second output pattern. According to the first output pattern, the sound of the speed shift and the speed shift shock can be reduced. According to the second output pattern, speed shift can be executed quickly.

Further, in the configuration described above, it is also possible that, when the actuator is to execute outputting by the second output pattern, a clutch corresponding to the shift position after the speed shift out of the first clutch and the second clutch is made to be in a connected state from start to finish of the speed shift in changing the shift position by one stage.

According to this configuration, drop of the driving force caused by disconnection of the clutch at the time of the speed shift can be prevented, and speed shift can be executed quickly.

Further, in the configuration described above, it is also possible that a clutch corresponding to the shift position before the speed shift out of the first clutch and the second clutch is disconnected in changing the shift position by one stage.

According to this configuration, since a clutch corresponding to the shift position before the speed shift is disconnected, the shift drum can be rotated smoothly, and speed shift can be executed smoothly by the second output pattern.

BRIEF DESCRIPTION OF DRAWINGS

FIG. 8 is a chart that explains the second output pattern.

DESCRIPTION OF EMBODIMENTS

Figure 1:
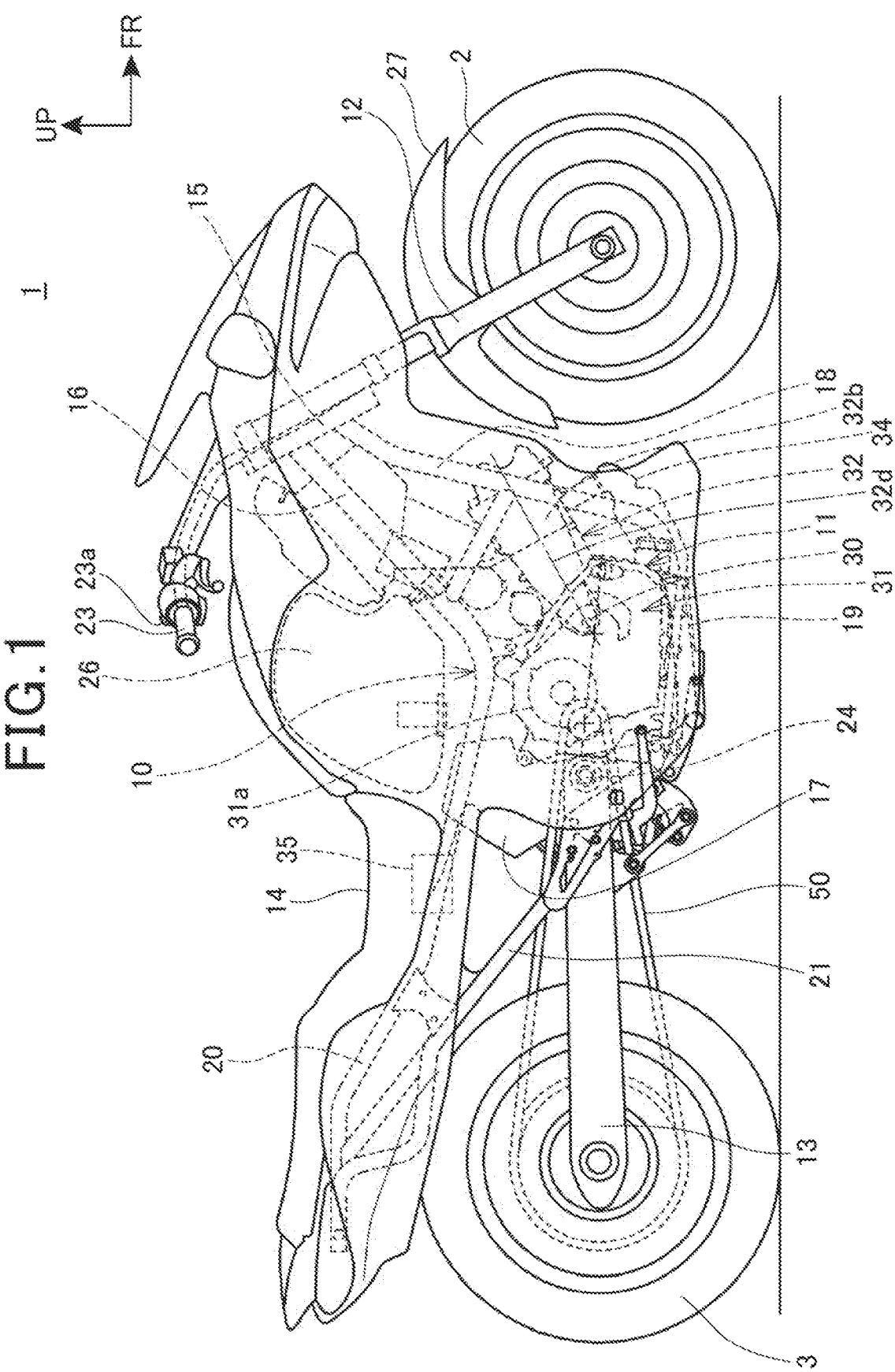
FIG. 1 is a right side view of a motorcycle related to an embodiment of the present invention.

Embodiments of the present invention will be hereinafter explained referring to the drawings. Also, in the explanation, description of the direction such as the front, rear, left, right, up, and down is to be the same as the direction with respect to the vehicle body unless a specific description is given. Also, a sign FR shown in each drawing represents vehicle body forward, a sign UP represents vehicle body upward, and a sign LH represents vehicle body left hand.

FIG. 1 is a right side view of a motorcycle 1 related to an embodiment of the present invention.

The motorcycle 1 is a vehicle where an engine 11 as a power unit is supported by a body frame 10, front forks 12 are steerably supported by the front end of the body frame 10, the front forks 12 steerably supporting a front wheel 2, and a swing arm 13 is arranged on the rear portion side of the body frame 10, the swing arm 13 supporting a rear wheel 3.

The motorcycle 1 is a saddle riding vehicle where an occupant straddlingly sits on a seat 14, and the seat 14 is arranged above the rear portion of the body frame 10.

The body frame 10 includes a head pipe 15, a main frame 16, center frames 17, a down frame 18, and a lower frame 19, the head pipe 15 being arranged at the front end of the body frame 10, the main frame 16 extending downward to the rear from the head pipe 15, the center frames 17 extending downward from the rear end of the main frame 16, the down frame 18 extending downward from the head pipe 15, the lower frame 19 extending rearward from the down frame 18 and being connected to the center frames 17.

Also, the body frame 10 includes a seat frame 20 and a sub-frame 21, the seat frame 20 extending rearward from the upper portion of the center frames 17, the sub-frame 21 connecting the lower portion of the center frames 17 and the rear portion of the seat frame 20 to each other.

The front forks 12 are turnably supported by the body frame 10 through a steering shaft (not illustrated) that is inserted to the head pipe 15. A handlebar 23 for steering is arranged at the upper end portion of the front forks 12. The front wheel 2 is supported by the lower end portion of the front forks 12.

The swing arm 13 is pivotally supported by a pivot shaft 24 that is supported by the left and right center frames 17. The pivot shaft 24 extends horizontally in the vehicle width direction. The swing arm 13 swings vertically around the pivot shaft 24 with the front end portion being pivotally supported by the pivot shaft 24.

The rear wheel 3 is supported by the rear end portion of the swing arm 13.

The engine 11 is disposed below the main frame 16 and between the down frame 18 and the center frames 17 in the vehicle longitudinal direction, and is fixed to the body frame 10.

A fuel tank 26 is disposed above the main frame 16 and between the head pipe 15 and the seat 14.

The seat 14 is supported by the seat frame 20 from below. A front fender 27 is supported by the front forks 12.

The motorcycle 1 includes a control portion 35 that is an electronic control portion controlling operation of the engine 11.

Figure 2:
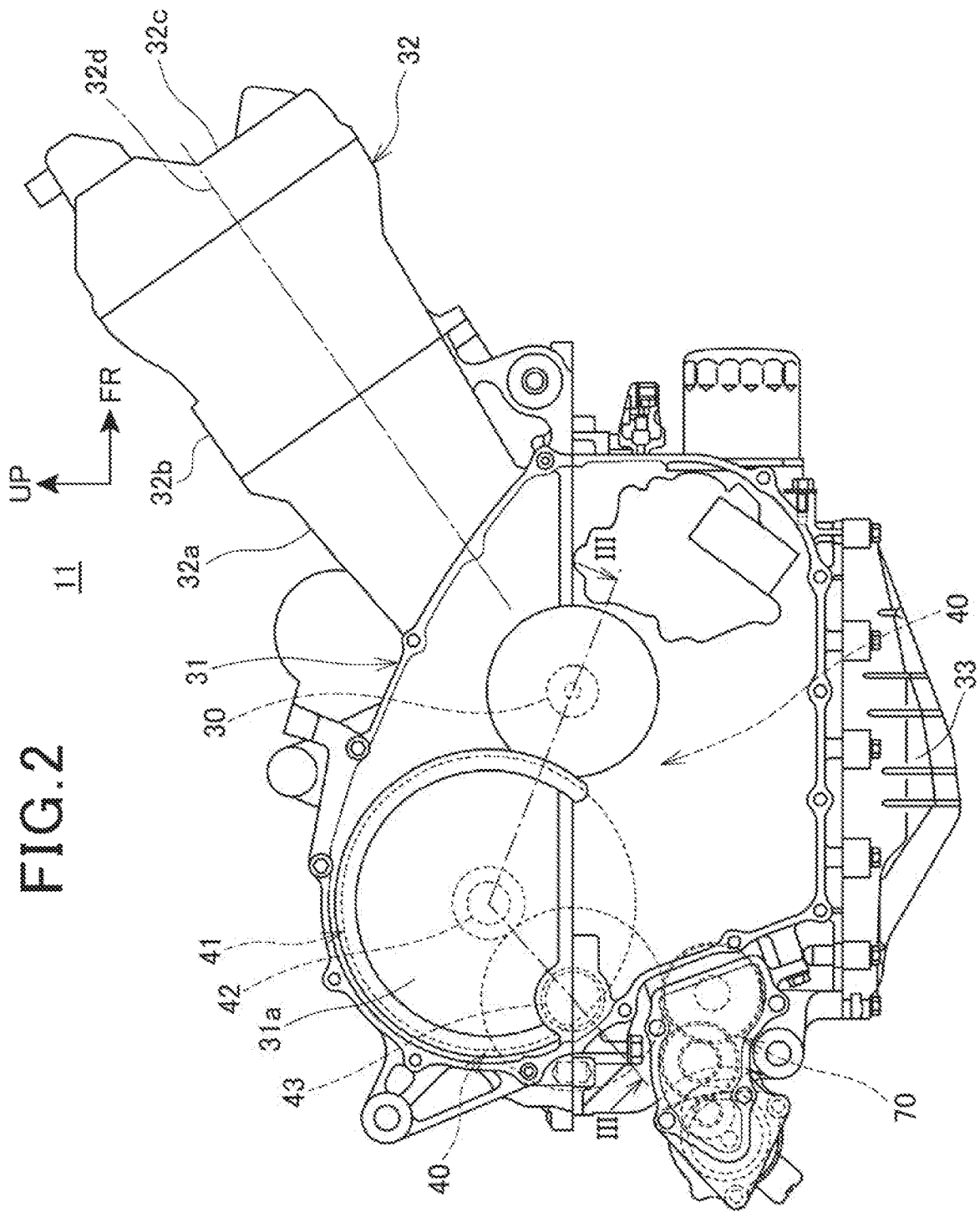
FIG. 2 is a right side view of an engine.

FIG. 2 is a right side view of the engine 11.

With reference to FIG. 1 and FIG. 2, the engine 11 which is an internal combustion engine includes a crankcase 31 and a cylinder portion 32, the crankcase 31 supporting a crankshaft 30 that extends horizontally in the vehicle width direction (the left-right direction), the cylinder portion 32 extending upward from the upper surface of the front portion of the crankcase 31.

The cylinder portion 32 includes a cylinder 32a, a cylinder head 32b, and a head cover 32c in this order from the crankcase 31 side, the cylinder 32a storing a piston (not illustrated). An axis 32d of the cylinder 32a inclines forward with respect to the vertical direction.

An oil pan 33 is attached to the lower surface of the crankcase 31.

An exhaust pipe 34 of the engine 11 is extracted downward from an exhaust port of the lower surface of the cylinder head 32b, and extends rearward.

Figure 3:
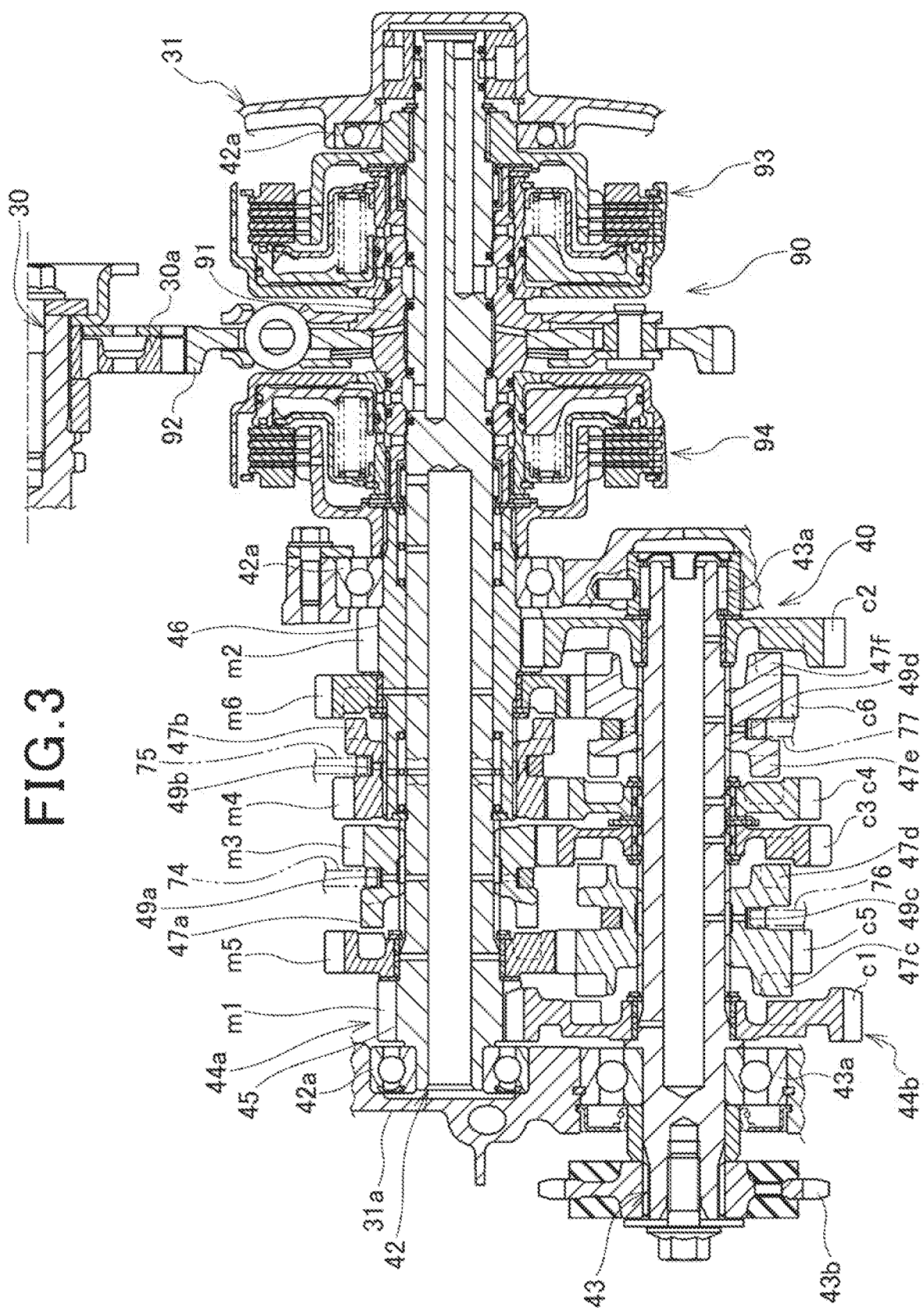
FIG. 3 is a cross-sectional view taken along the line III-III of FIG. 2.

FIG. 3 is a cross-sectional view taken along the line III-III of FIG. 2.

With reference to FIG. 2 and FIG. 3, the engine 11 includes a transmission device 40 that changes speed of rotation of the crankshaft 30, and outputs the rotation having been changed to the side of the rear wheel 3 that is the driving wheel.

The transmission device 40 includes a transmission 41, a transmission drive mechanism 70, a clutch mechanism 90, and the control portion 35, the transmission 41 configuring plural shift positions, the transmission drive mechanism 70 operating the shift position of the transmission 41, the clutch mechanism 90 switching power transfer between the crankshaft 30 and the transmission 41.

The rear portion of the crankcase 31 behind the crankshaft 30 is a transmission case portion 31a where the transmission 41, the transmission drive mechanism 70, and the clutch mechanism 90 are arranged.

The transmission 41 includes a main shaft 42, a countershaft 43, a driving gear group 44a, and a driven gear group 44b, the main shaft 42 and the countershaft 43 being disposed so as to be arrayed front and rear, the driving gear group 44a being arranged in the outer periphery of the main shaft 42, the driven gear group 44b being arranged in the outer periphery of the countershaft 43. The transmission 41 is a constantly engage type transmission where the driving gear group 44a and the driven gear group 44b constantly engage with each other.

The main shaft 42 and the countershaft 43 are disposed in parallel with the crankshaft 30.

With reference to FIG. 3, the main shaft 42 is rotatably supported by the crankcase 31 through plural bearings 42a.

The countershaft 43 is rotatably supported by the crankcase 31 through bearings 43a that are arranged at both ends.

The main shaft 42 includes an inner shaft 45 and an outer shaft 46, the outer shaft 46 being fit to the outer periphery of the inner shaft 45 and having a cylindrical shape.

The outer shaft 46 is disposed coaxially with the inner shaft 45, and is relatively rotatable with respect to the inner shaft 45.

The outer shaft 46 is formed to have shorter total length compared to the inner shaft 45, and is disposed at an intermediate portion in the axial direction of the main shaft 42.

The driving gear group 44a includes a first speed driving gear m1, a second speed driving gear m2, a third speed driving gear m3, a fourth speed driving gear m4, a fifth speed driving gear m5, and a sixth speed driving gear m6.

With respect to the driving gear group 44a, the first speed driving gear m1, the fifth speed driving gear m5, the third speed driving gear m3, the fourth speed driving gear m4, the sixth speed driving gear m6, and the second speed driving gear m2 are disposed in this order from one end side (the left side) of the main shaft 42.

The first speed driving gear m1, the fifth speed driving gear m5, and the third speed driving gear m3 corresponding to the shift position of odd number stages are disposed on the inner shaft 45.

The fourth speed driving gear m4, the sixth speed driving gear m6, and the second speed driving gear m2 corresponding to the shift position of even number stages are disposed on the outer shaft 46.

The driven gear group 44b includes a first speed driven gear c1 engaging with the first speed driving gear m1, a fifth speed driven gear c5 engaging with the fifth speed driving gear m5, a third speed driven gear c3 engaging with the third speed driving gear m3, a fourth speed driven gear c4 engaging with the fourth speed driving gear m4, a sixth speed driven gear c6 engaging with the sixth speed driving gear m6, and a second speed driven gear c2 engaging with the second speed driving gear m2 from one end side (the left side) of the countershaft 43.

The first speed driving gear m1 is formed integrally with the inner shaft 45, and is a fixed gear rotating integrally with the inner shaft 45. The second speed driving gear m2 is formed integrally with the outer shaft 46, and is a fixed gear rotating integrally with the outer shaft 46.

The fifth speed driving gear m5 is a free gear arranged so as to be relatively rotatable and axially non-movable with respect to the inner shaft 45.

The sixth speed driving gear m6 is a free gear arranged so as to be relatively rotatable and axially non-movable with respect to the outer shaft 46.

The first speed driven gear c1, the third speed driven gear c3, the fourth speed driven gear c4, and the second speed driven gear c2 are free gears arranged so as to be relatively rotatable and axially non-movable with respect to the countershaft 43.

The third speed driving gear m3 is a shifter gear that is relatively non-rotatable and axially movable with respect to the inner shaft 45. The third speed driving gear m3 includes a dog tooth 47a that is engageable with the side surface of the fifth speed driving gear m5. Also, in the outer periphery of the third speed driving gear m3, a groove 49a is arranged, a shifter 74 engaging with the groove 49a, the shifter 74 moving the third speed driving gear m3 in the axial direction.

The fourth speed driving gear m4 is a shifter gear that is relatively non-rotatable and axially movable with respect to the outer shaft 46. The fourth speed driving gear m4 includes a dog tooth 47b that is engageable with the side surface of the sixth speed driving gear m6. Also, in the outer periphery of the fourth speed driving gear m4, a groove 49b is arranged, a shifter 75 engaging with the groove 49b, the shifter 75 moving the fourth speed driving gear m4 in the axial direction.

The fifth speed driven gear c5 and the sixth speed driven gear c6 are shifter gears that are relatively non-rotatable and axially movable with respect to the countershaft 43.

The fifth speed driven gear c5 includes a dog tooth 47c and a dog tooth 47d, the dog tooth 47c being engageable with the side surface of the first speed driven gear c1, the dog tooth 47d being engageable with the side surface of the third speed driven gear c3. Also, in the outer periphery of the fifth speed driven gear c5, a groove 49c is arranged, a shifter 76 engaging with the groove 49c, the shifter 76 moving the fifth speed driven gear c5 in the axial direction.

The sixth speed driven gear c6 includes a dog tooth 47e and a dog tooth 47f, the dog tooth 47e being engageable with the side surface of the fourth speed driven gear c4, the dog tooth 47f being engageable with the side surface of the second speed driven gear c2. Also, in the outer periphery of the sixth speed driven gear c6, a groove 49d is arranged, a shifter 77 engaging with the groove 49d, the shifter 77 moving the sixth speed driven gear c6 in the axial direction.

In a state illustrated in FIG. 3, the shift position of the transmission 41 is in a neutral state (neutral stage), and all of the fifth speed driving gear m5, the sixth speed driving gear m6, the first speed driven gear c1, the third speed driven gear c3, the fourth speed driven gear c4, and the second speed driven gear c2 which are free gears are not fixed onto the main shaft 42 and the countershaft 43, and are relatively rotatable with respect to the main shaft 42 and the countershaft 43.

In a neutral state, even when the main shaft 42 may rotate, the driven gear group 44b only rotates idle with respect to the driving gear group 44a, and rotation of the main shaft 42 is not transferred to the countershaft 43.

With respect to the neutral state, when the fifth speed driven gear c5 moves and the dog tooth 47c engages with the first speed driven gear c1, the first speed driven gear c1 is fixed to the countershaft 43, and the first speed stage is established.

With respect to the neutral state, when the sixth speed driven gear c6 moves and the dog tooth 47f engages with the second speed driven gear c2, the second speed driven gear c2 is fixed to the countershaft 43, and the second speed stage is established.

With respect to the neutral state, when the fifth speed driven gear c5 moves and the dog tooth 47d engages with the third speed driven gear c3, the third speed driven gear c3 is fixed to the countershaft 43, and the third speed stage is established.

With respect to the neutral state, when the sixth speed driven gear c6 moves and the dog tooth 47e engages with the fourth speed driven gear c4, the fourth speed driven gear c4 is fixed to the countershaft 43, and the fourth speed stage is established.

With respect to the neutral state, when the third speed driving gear m3 moves and the dog tooth 47a engages with the fifth speed driving gear m5, the fifth speed driving gear m5 is fixed to the inner shaft 45, and the fifth speed stage is established.

With respect to the neutral state, when the fourth speed driving gear m4 moves and the dog tooth 47b engages with the sixth speed driving gear m6, the sixth speed driving gear m6 is fixed to the outer shaft 46, and the sixth speed stage is established.

At the shaft end of the countershaft 43, a drive sprocket 43b is arranged. Drive force of the engine 11 is transferred to the rear wheel 3 through a driving chain 50 (FIG. 1) that is stretched between the drive sprocket 43b and the rear wheel 3.

The clutch mechanism 90 is disposed on the main shaft 42. In the axial direction of the main shaft 42, the clutch mechanism 90 is arranged on the opposite side of the first speed driving gear m1, the fifth speed driving gear m5, the third speed driving gear m3 of odd number stages across the outer shaft 46.

The clutch mechanism 90 includes a clutch shaft 91, a primary driven gear 92, a first clutch 93, and a second clutch 94, the clutch shaft 91 being fit to the outer periphery of the inner shaft 45 of the main shaft 42 and having a cylindrical shape, the primary driven gear 92 being fixed onto the clutch shaft 91, the first clutch 93 connecting and disconnecting power transfer between the crankshaft 30 and the inner shaft 45, the second clutch 94 connecting and disconnecting power transfer between the crankshaft 30 and the outer shaft 46.

The clutch shaft 91 is arranged coaxially with the inner shaft 45, and is relatively rotatable with respect to the inner shaft 45.

With the primary driven gear 92, a primary drive gear 30a engages, the primary drive gear 30a being arranged on the crankshaft 30. The clutch shaft 91 is rotated by the crankshaft 30 through the primary driven gear 92.

The second clutch 94 is a friction type hydraulic clutch that is disposed over the clutch shaft 91 and the outer shaft 46.

The first clutch 93 is a friction type hydraulic clutch that is disposed over the clutch shaft 91 and the inner shaft 45.

The first clutch 93 and the second clutch 94 are operated independently from each other by hydraulic pressure supplied by control of the control portion 35.

When the first clutch 93 is connected, the clutch shaft 91 and the inner shaft 45 come to rotate integrally with each other, and power transfer from the inner shaft 45 to the countershaft 43 is enabled.

When the second clutch 94 is connected, the clutch shaft 91 and the outer shaft 46 come to rotate integrally with each other, and power transfer from the outer shaft 46 to the countershaft 43 is enabled.

That is, the transmission device 40 includes one system and the other system, the one system transferring power by any one of the first speed stage, the third speed stage, and the fifth speed stage of odd number stages through the first clutch 93 and the inner shaft 45, the other system transferring power by any one of the second speed stage, the fourth speed stage, and the sixth speed stage of even number stages through the second clutch 94 and the outer shaft 46, and executes speed shift so as to switch these systems alternately.

The first speed stage, the third speed stage, and the fifth speed stage of odd number stages are a part of plural shift positions, and the second speed stage, the fourth speed stage, and the sixth speed stage of even number stages are the other part of the plural shift positions.

Figure 4:
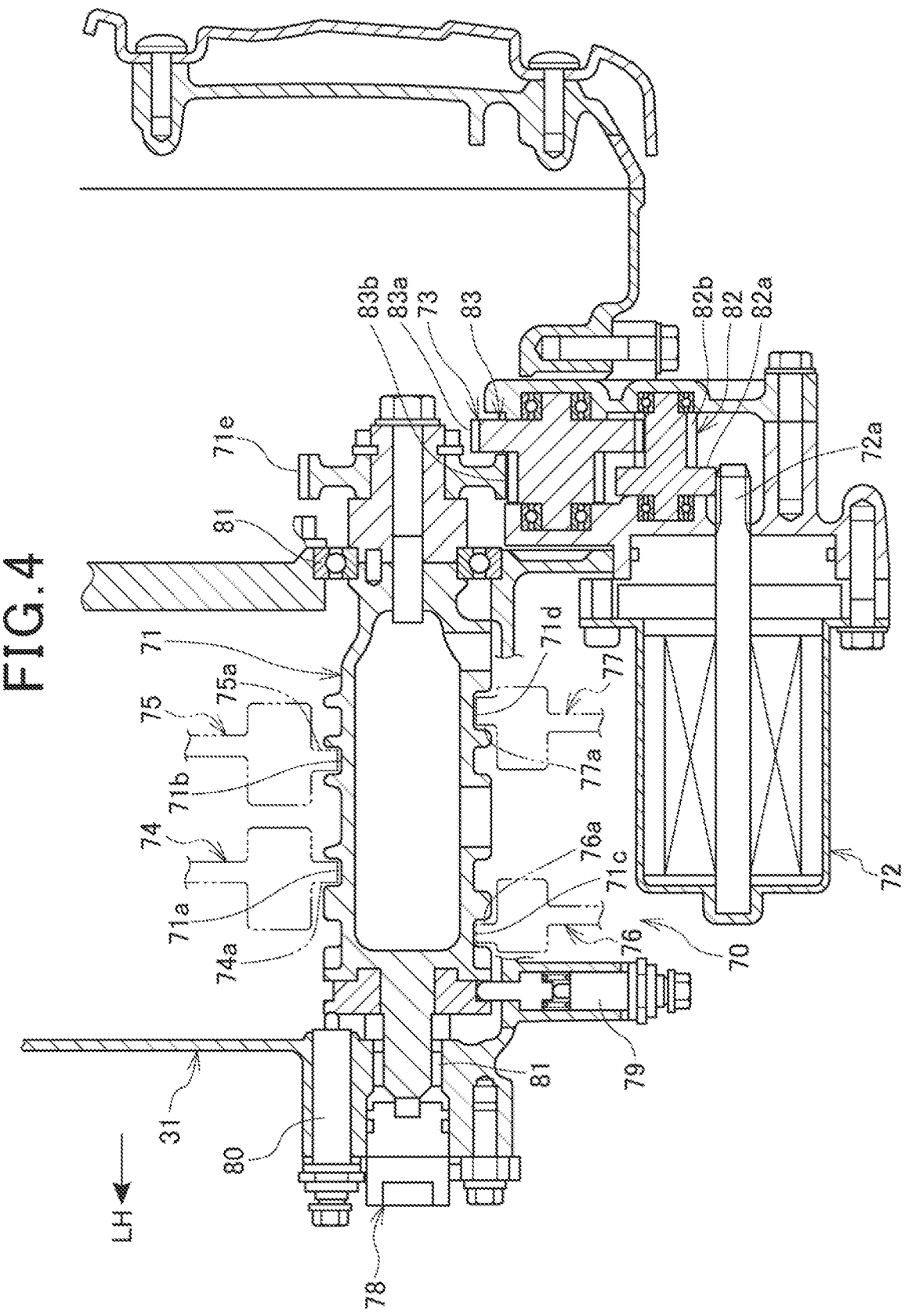
FIG. 4 is a cross-sectional view that shows a transmission drive mechanism.

FIG. 4 is a cross-sectional view that shows the transmission drive mechanism 70.

The transmission drive mechanism 70 includes a shift drum 71 that rotates, an actuator 72, a speed reduction gear portion 73, and the shifters 74 to 77, the actuator 72 rotatively driving the shift drum 71, the speed reduction gear portion 73 decelerating rotation of the actuator 72 and transferring decelerated rotation to the shift drum 71.

Also the transmission drive mechanism 70 includes an angle sensor 78, a position sensor 79, and a neutral sensor 80, the angle sensor 78 detecting rotation of the shift drum 71, the position sensor 79 detecting that the shift drum 71 is at a predetermined rotation angle, the neutral sensor 80 detecting that the shift drum 71 is at a position corresponding to the neutral state described above.

The shift drum 71 is rotatably supported by the crankcase 31 through plural bearings 81. The shift drum 71 is a shaft-like member that is long in the vehicle width direction, and is disposed in parallel with the main shaft 42 and the countershaft 43.

In the outer periphery of the shift drum 71, a first lead groove 71a (lead groove), a second lead groove 71b (lead groove), a third lead groove 71c (lead groove), and a fourth lead groove 71d (lead groove) are arranged, the shifter 74 engaging with the first lead groove 71a, the shifter 75 engaging with the second lead groove 71b, the shifter 76 engaging with the third lead groove 71c, the shifter 77 engaging with the fourth lead groove 71d.

At one end portion in the axial direction of the shift drum 71, an input gear 71e is arranged.

The actuator 72 is an electric motor that is rotatively driven by control of the control portion 35. A rotary shaft 72a of the actuator 72 is disposed in parallel with the shift drum 71. The actuator 72 is supported by the crankcase 31.

The speed reduction gear portion 73 includes a first gear shaft 82 and a second gear shaft 83, and is supported by the crankcase 31. The first gear shaft 82 and the second gear shaft 83 rotate around axes that are parallel with the rotary shaft 72a of the actuator 72.

The first gear shaft 82 includes a large diameter gear 82a and a small diameter gear 82b, the large diameter gear 82a engaging with the rotary shaft 72a of the actuator 72, the small diameter gear 82b having a smaller diameter compared to the large diameter gear 82a.

The second gear shaft 83 includes a large diameter gear 83a and a small diameter gear 83b, the large diameter gear 83a engaging with the small diameter gear 82b, the small diameter gear 83b having a smaller diameter compared to the large diameter gear 83a and engaging with the input gear 71e of the shift drum 71.

The shifters 74 to 77 are supported by guide shafts (not illustrated) extending in parallel with the shift drum 71, and are slidable in the axial direction of the shift drum 71 along these guide shafts.

The shifter 74 engages with the first lead groove 71a through a pin portion 74a that is arranged at one end portion, and the other end portion 74b engages with the groove 49a (FIG. 3) of the third speed driving gear m3.

The shifter 75 engages with the second lead groove 71b through a pin portion 75a that is arranged at one end portion, and the other end portion 75b engages with the groove 49b (FIG. 3) of the fourth speed driving gear m4.

The shifter 76 engages with the third lead groove 71c through a pin portion 76a that is arranged at one end portion, and the other end portion 76b engages with the groove 49c (FIG. 3) of the fifth speed driven gear c5.

The shifter 77 engages with the fourth lead groove 71d through a pin portion 77a that is arranged at one end portion, and the other end portion 77b engages with the groove 49d (FIG. 3) of the sixth speed driven gear c6.

When the shift drum 71 is rotated by the actuator 72, the shifters 74 to 77 slide respectively along patterns of the first lead groove 71a, the second lead groove 71b, the third lead groove 71c, and the fourth lead groove 71d through the pin portions 74a, 75a, 76a, 77a.

Thus, the third speed driving gear m3, the fourth speed driving gear m4, the fifth speed driven gear c5, and the sixth speed driven gear c6 which are shifter gears move respectively in the axial direction of the shift drum 71, and the shift position of the transmission 41 is switched.

The angle sensor 78 is disposed so as to oppose an end portion on the opposite side of an end portion of the side the input gear 71e is arranged in the shift drum 71.

Figure 5:
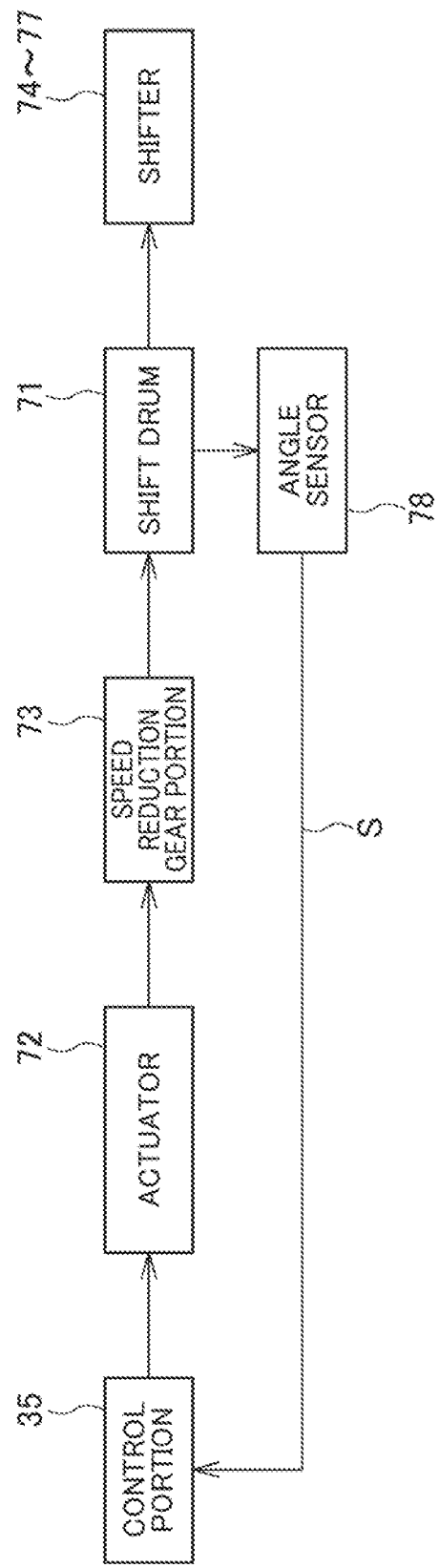
FIG. 5 is a block diagram that shows a transmission drive mechanism.

The angle sensor 78 detects rotation of the shift drum 71, and outputs the detection result to the control portion 35 as an output value S (FIG. 5).

FIG. 5 is a block diagram that shows the transmission drive mechanism 70.

The control portion 35 controls electric power supplied to the actuator 72, and drives the rotary shaft 72a. Rotation of the rotary shaft 72a is decelerated by the speed reduction gear portion 73 and is transferred to the shift drum 71, and the shifters 74 to 77 are driven by rotation of the shift drum 71.

The control portion 35 feedback-controls the actuator 72 based on the output value S of the angle sensor 78, and allows the shift drum 71 to be positioned at a target rotation angle.

The angle sensor 78 outputs voltage corresponding to the rotation angle of the shift drum 71 as the output value S.

The control portion 35 includes a calculation unit (not illustrated) and a storage unit (not illustrated). The calculation unit is a processor such as a CPU. The control portion 35 controls the transmission device 40 by executing a program stored in the storage unit. The storage unit is a non-volatile storage device such as a flash ROM and an EEPROM, and stores a program executed by the calculation portion, data processed by the calculation portion, and the like.

The transmission drive mechanism 70 directly rotates the shift drum 71 by rotation of the actuator 72, and allows the shift drum 71 to be positioned at the target rotation angle with high accuracy by feedback control. Therefore, the transmission drive mechanism 70 is not provided with a mechanism that intermittently rotates the shift drum 71 by a star-shape drum and the like and was frequently used in the past.

In a state electric power is not supplied, the actuator 72 exerts comparatively large cogging torque. In a state of being positioned at a target rotation angle namely in a neutral state or a state the first speed stage is established for example, rotation of the shift drum 71 is restricted by cogging torque of the actuator 72 applied to the shift drum 71 through the speed reduction gear portion 73. Thus, the transmission 41 is maintained at a state a predetermined shift position is established. That is, the rotation angle of the shift drum 71 is controlled by a driving force and cogging torque of the actuator 72.

Figure 6:
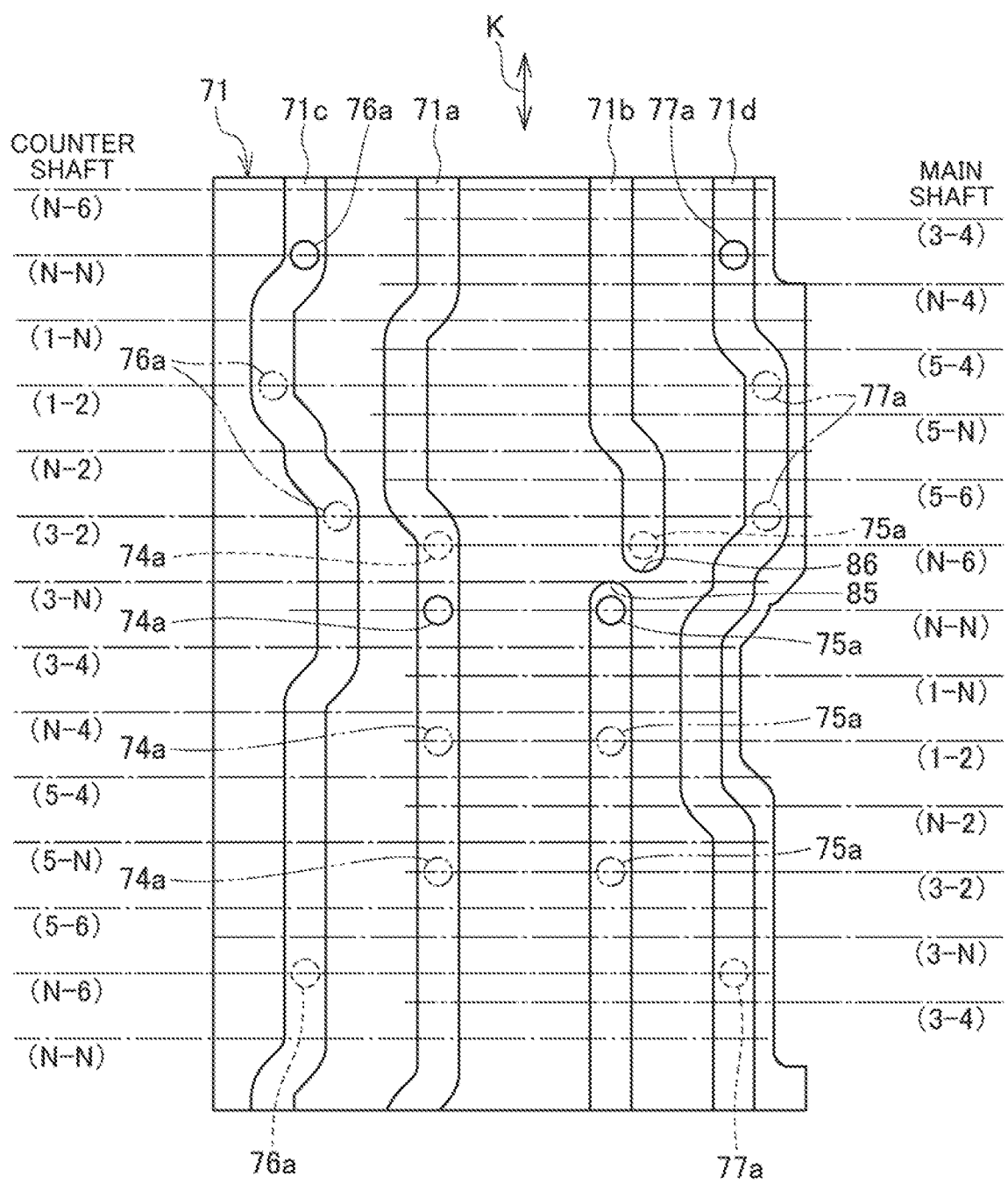
FIG. 6 is a drawing in which the first lead groove, the second lead groove, the third lead groove, and the fourth lead groove are spread in the rotation direction of the shift drum.

FIG. 6 is a drawing in which the first lead groove 71a, the second lead groove 71b, the third lead groove 71c, and the fourth lead groove 71d are spread in the rotation direction K of the shift drum 71.

The first lead groove 71a, the second lead groove 71b, the third lead groove 71c, and the fourth lead groove 71d are long grooves extending in the rotation direction K while partially shifting to the left and right.

The first lead groove 71a, the third lead groove 71c, and the fourth lead groove 71d are endless grooves going around the outer periphery of the shift drum 71.

The second lead groove 71b is a groove including an end wall 85 and an end wall 86 at both ends of the rotation direction K, and does not make one complete round of the outer periphery of the shift drum 71.

The first lead groove 71a and the second lead groove 71b are positioned so as to be arrayed at the center in the left-right direction of FIG. 6, the shifters 74, 75 for the main shaft 42 respectively engaging with the first lead groove 71a and the second lead groove 71b.

The third lead groove 71c and the fourth lead groove 71d are positioned so as to be arrayed at the ends in the left-right direction of FIG. 6, the shifters 76, 77 for the countershaft 43 respectively engaging with the third lead groove 71c and the fourth lead groove 71d.

In FIG. 6, marks such as (N-N) expressing the position of the shift drum 71 are shown corresponding to each of the main shaft 42 and the countershaft 43.

A mark in the left in a parenthesis of FIG. 6 expresses a shift position of an odd number stage, and a mark in the right in a parenthesis of FIG. 6 expresses a shift position of an even number stage.

At a position of (N-N), the neutral state is established.

At positions of (1-N), (N-2), (3-N), (N-4), (5-N), and (N-6), the first speed stage to the sixth speed stage are established respectively.

When the shift drum 71 is rotated from the position of (N-N), the first speed stage to the sixth speed stage are established in sequence.

The position of (N-N) corresponding to the neutral state is the position of the lowest stage of the speed shift, and the position of (N-6) corresponding to the sixth speed stage is the position of the highest stage of the speed shift.

For example, as shown in a solid line in FIG. 6, when the shifters 74 to 77 are positioned at the position of (N-N), the third speed driving gear m3 and the fourth speed driving gear m4 arranged on the main shaft 42 are in a neutral state. Also, in this state, the fifth speed driven gear c5 and the sixth speed driven gear c6 arranged on the countershaft 43 are in a neutral state.

Further, for example, as shown in a broken line in FIG. 6, when the shifters 74 to 77 are positioned at the position of (N-6), the third speed driving gear m3 on the main shaft 42 is at the same position as that of the neutral state, and the fourth speed driving gear m4 on the main shaft 42 is in a state of moving to the right side to establish the sixth speed stage and engaging with the sixth speed driving gear m6. Also, in this state, the fifth speed driven gear c5 and the sixth speed driven gear c6 arranged on the countershaft 43 are at the same position as that of the neutral state.

The shift drum 71 includes plural numbers of intermediate positions for allowing the shifters 74 to 77 to be positioned at a position different from that before the speed shift and that after the speed shift while the shift position is changed by one stage.

The intermediate positions are illustrated respectively by (1-2), (3-2), (3-4), (5-4), and (5-6) in FIG. 6.

For example, as shown in an imaginal line in FIG. 6, when the shifters 74 to 77 are positioned at the intermediate position of (1-2), the first speed stage and the second speed stage are established in the transmission 41.

In this case, the third speed driving gear m3 and the fourth speed driving gear m4 arranged on the main shaft 42 are at the same position as that of the neutral state. Also, the fifth speed driven gear c5 on the countershaft 43 is in a state of moving to the left side to establish the first speed stage and engaging with the first speed driven gear c1, and the sixth speed driven gear c6 on the countershaft 43 is in a state of moving to the right side to establish the second speed stage and engaging with the second speed driven gear c2.

While connecting the first clutch 93 at the position of (1-N) and traveling at the first speed stage, the control portion 35 drives the transmission drive mechanism 70 to achieve the intermediate position of (1-2), and forms a preliminary speed shift state of establishing both of the first speed stage and the second speed stage. In this state, the first clutch 93 is connected and the second clutch 94 is disconnected.

Thereafter, in shifting up from the first speed stage to the second speed stage, the control portion 35 disconnects the first clutch 93, connects the second clutch 94, and thereafter drives the actuator 72 to achieve the position of (N-2) of the shift drum 71. Thus, since speed shift is executed only by changing the connection state of the first clutch 93 and the second clutch 94 from the preliminary speed shift state, speed shift is executed quickly.

In a similar manner, with respect also to the intermediate positions of (3-4) and (5-6), speed shift is executed by disconnecting the first clutch 93 and connecting the second clutch 94 in the preliminary speed shift state.

Also, for example, as shown in an imaginal line in FIG. 6, when the shifters 74 to 77 are positioned at the intermediate position of (3-2), the second speed stage and the third speed stage are established in the transmission 41.

In this case, the third speed driving gear m3 and the fourth speed driving gear m4 arranged on the main shaft 42 are at the same position as that of the neutral state. Also, the fifth speed driven gear c5 on the countershaft 43 is in a state of moving to the right side to establish the third speed stage and engaging with the third speed driven gear c3, and the sixth speed driven gear c6 on the countershaft 43 is in a state of moving to the right side to establish the second speed stage and engaging with the second speed driven gear c2.

While connecting the second clutch 94 at the position of (N-2) and traveling at the second speed stage, the control portion 35 drives the transmission drive mechanism 70 to achieve the position of (3-2), and forms a preliminary speed shift state of establishing both of the first speed stage and the second speed stage. In this state, the second clutch 94 is connected and the first clutch 93 is disconnected.

Thereafter, in shifting up from the second speed stage to the third speed stage, the control portion 35 disconnects the second clutch 94, connects the first clutch 93, and thereafter drives the actuator 72 to achieve the position of (3-N) of the shift drum 71. Thus, since speed shift is executed only by changing the connection state of the first clutch 93 and the second clutch 94 from the preliminary speed shift state, speed shift is executed quickly.

In a similar manner, with respect also to the intermediate positions of (5-4), speed shift is executed by disconnecting the second clutch 94 and connecting the first clutch 93 in the preliminary speed shift state.

The transmission drive mechanism 70 is provided with a first output pattern E1 (FIG. 7) and a second output pattern E2 (FIG. 8), the first output pattern E1 for stopping rotation of the actuator 72 once at the intermediate position to achieve the preliminary speed shift state in changing the shift position by one stage, the second output pattern E2 for changing the shift position by one stage skipping over the intermediate position in changing the shift position by one stage. That is, with respect to the output pattern of the actuator 72, there are the first output pattern E1 and the second output pattern E2, and the output pattern is variable.

With reference to FIG. 1, the motorcycle 1 includes a mode switch button 23a in the handlebar 23 as an operation portion operated by the occupant. By operating the mode switch button 23a, the occupant can optionally switch the output pattern between the first output pattern E1 and the second output pattern E2.

Figure 7:
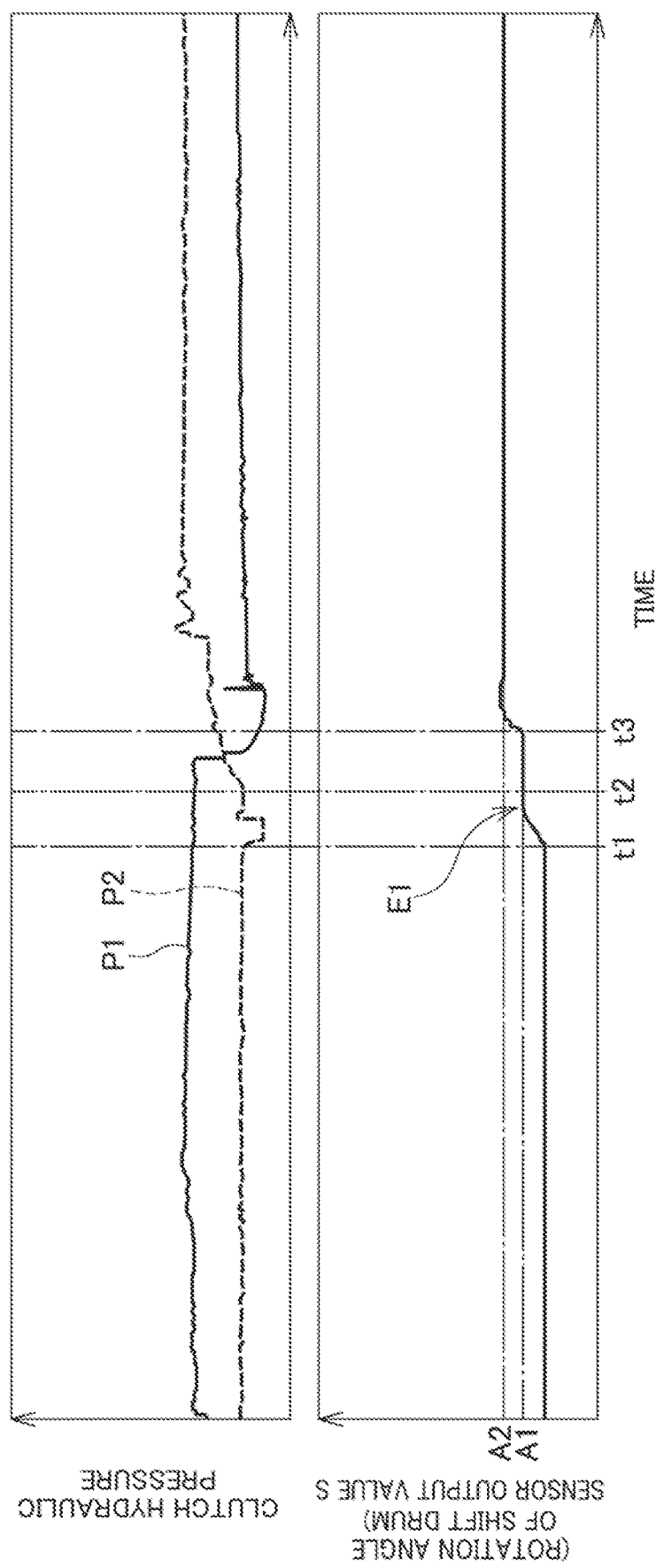
FIG. 7 is a chart that explains the first output pattern.

FIG. 7 is a chart that explains the first output pattern E1. In FIG. 7, the elapsed time is shown in the horizontal axis, and the hydraulic pressure of the clutch mechanism 90 and the output value of the angle sensor 78 are shown in the vertical axis.

Here, variation of the hydraulic pressure P1 of the first clutch 93 and the hydraulic pressure P2 of the second clutch 94 with respect to the time is shown in FIG. 7. The first clutch 93 is connected in a state the hydraulic pressure P1 is high, and is disconnected in a state the hydraulic pressure P1 is low. The second clutch 94 is connected in a state of high hydraulic pressure P2, and is disconnected in a state of low hydraulic pressure P2.

Also, the output value S of the angle sensor 78 of FIG. 7 expresses the rotation angle of the shift drum 71. The rotation angle of the shift drum 71 and the output value S of the angle sensor 78 are in generally direct proportion to each other, and the output value S of the angle sensor 78 becomes larger as the rotation angle of the shift drum 71 is larger.

Variation of the output value S of the angle sensor 78 with respect to the time shown in FIG. 7 is caused by the result of rotation of the actuator 72, and expresses the first output pattern E1 of the actuator 72.

In the explanation below, the output value S of the angle sensor 78 is explained as the rotation angle of the shift drum 71.

FIG. 7 shows a case of shifting up from the first speed stage to the second speed stage in an automatic transmission mode where the transmission drive mechanism 70 executes speed shift automatically.

When the motorcycle 1 reaches a predetermined vehicle speed for example during traveling at the first speed stage, the control portion 35 starts shifting up from the first speed stage to the second speed stage.

In this case, with reference to FIG. 6 and FIG. 7, the control portion 35 drives the actuator 72 first at time t1 to shift the shift drum 71 from the position of (1-N) to the intermediate position of (1-2), and forms the preliminary speed shift state. At the intermediate position of (1-2), the rotation angle of the shift drum 71 is the angle A1. In the preliminary speed shift state, the first clutch 93 is connected, and the second clutch 94 is disconnected.

After the shift drum 71 comes to the intermediate position of (1-2) at time t2, the control portion 35 disconnects the first clutch 93, connects the second clutch 94, drives the actuator 72 thereafter at time t3 to shift the shift drum 71 to the position of (N-2), and completes shifting up to the second speed stage. At the position of (N-2), the rotation angle of the shift drum 71 is the angle A2. The angle A1 is 30° for example, and the angle A2 is 60° for example.

Here, between the time t2 and the time t3 namely in a state of the intermediate position, the rotation angle of the shift drum 71 is constant at the angle A1, and rotation of the shift drum 71 is stopped.

FIG. 8 is a chart that explains the second output pattern E2. In FIG. 8, the elapsed time is shown in the horizontal axis, and the signal of the speed shift instruction, the hydraulic pressure of the clutch mechanism 90, and the output value of the angle sensor 78 are shown in the vertical axis.

FIG. 8 shows a case of shifting up from the first speed stage to the second speed stage and a case of shifting up from the second speed stage to the third speed stage in a manual transmission mode where the transmission drive mechanism 70 executes speed shift according to the speed shift operation of the occupant.

Variation of the output value S of the angle sensor 78 with respect to the time shown in FIG. 8 is caused by the result of rotation of the actuator 72, and expresses the second output pattern E2 of the actuator 72.

When a signal I1 of the speed shift instruction to the second speed stage is inputted while the motorcycle 1 travels at the first speed stage, the control portion 35 starts shifting up from the first speed stage to the second speed stage.

With reference to FIG. 6 and FIG. 8, when the second output pattern E2 has been selected, in a state the motorcycle 1 travels by the first speed stage at the position of (1-N), the control portion 35 allows both of the first clutch 93 and the second clutch 94 to be in the connected state. In this state, since the shift position on the even number stage side is in the same state as the neutral state, even when the second clutch 94 may be connected, power is not transferred from the outer shaft 46 to the countershaft 43.

First, at time T1, the control portion 35 disconnects the first clutch 93, and drives the actuator 72 to shift the shift drum 71 from the position of (1-N) to the position of (N-2).

At time T2, the shift drum 71 comes to the position of (N-2), and shifting up to the second speed stage is completed. Thereafter, the control portion 35 connects the first clutch 93 again.

At the position of (N-2), the rotation angle of the shift drum 71 is the angle A2.

That is, with the second output pattern E2, the position of the shift drum 71 changes at one time from (1-N) to (N-2), and the intermediate position of (1-2) along the way is skipped. Rotation of the shift drum 71 is not stopped during the course of shifting of the position from (1-N) to (N-2). Therefore, speed shift can be executed quickly.

Also, with the second output pattern E2, the second clutch 94 is in a connected state between time T1 to time T2 namely between start and finish of the speed shift. The second clutch 94 is a clutch corresponding to the second speed stage that is the shift position after the speed shift in shifting up from the first speed stage to the second speed stage. Thus, since the second clutch 94 corresponding to the shift position after the speed shift is maintained at a connected state between start and finish of the speed shift, drop of the driving force caused by disconnection of the second clutch 94 at the time of the speed shift can be prevented, and seamless speed shift can be executed quickly. Therefore, the motorcycle 1 can be accelerated efficiently.

Also, the first clutch 93 corresponding to the first speed stage that is the shift position before the speed shift in shifting up from the first speed stage to the second speed stage is disconnected when the shift drum 71 is rotated between time T1 and time T2. Thus, engagement of the fifth speed driven gear c5 (FIG. 3) and the first speed driven gear c1 which are the shifter gears for establishing the first speed stage comes to be easily released, and the shift drum 71 can be rotated easily. Therefore, it is possible to rotate the shift drum 71 smoothly and to execute speed shift quickly.

When a signal I2 of the speed shift instruction to the third speed stage is inputted while the motorcycle 1 travels at the second speed stage, the control portion 35 starts shifting up from the second speed stage to the third speed stage.

When the second output pattern E2 has been selected, in a state the motorcycle 1 travels by the second speed stage at the position of (N-2), the control portion 35 allows both of the first clutch 93 and the second clutch 94 to be in the connected state. In this state, since the shift position on the odd number stage side is in the same state as the neutral state, even when the first clutch 93 may be connected, power is not transferred from the inner shaft 45 to the countershaft 43.

In shifting up to the third speed stage, first, at time T3, the control portion 35 disconnects the second clutch 94, drives the actuator 72, and shifts the shift drum 71 from the position of (N-2) to the position of (3-N).

At time T4, the shift drum 71 comes to the position of (3-N), and shifting up to the third speed stage is completed. Thereafter, the control portion 35 connects the second clutch 94 again.

At the position of (3-N), the rotation angle of the shift drum 71 is the angle A3.

That is, with the second output pattern E2, the position of the shift drum 71 changes at one time from (N-2) to (3-N), and the intermediate position of (3-2) along the way is skipped. Rotation of the shift drum 71 is not stopped during the course of shifting of the position from (N-2) to (3-N). Therefore, speed shift can be executed quickly.

Also, with the second output pattern E2, the first clutch 93 is in a connected state between time T3 to time T4 namely between start and finish of the speed shift. The first clutch 93 is a clutch corresponding to the third speed stage that is the shift position after the speed shift in shifting up from the second speed stage to the third speed stage. Thus, since the first clutch 93 corresponding to the shift position after the speed shift is maintained at a connected state between start and finish of the speed shift, drop of the driving force caused by disconnection of the first clutch 93 at the time of the speed shift can be prevented, and seamless speed shift can be executed quickly. Therefore, the motorcycle 1 can be accelerated efficiently.

Also, the second clutch 94 corresponding to the second speed stage that is the shift position before the speed shift in shifting up from the second speed stage to the third speed stage is disconnected when the shift drum 71 is rotated between time T3 and time T4. Thus, engagement of the sixth speed driven gear c6 (FIG. 3) and the second speed driven gear c2 which are the shifter gears for establishing the second speed stage comes to be easily released, and the shift drum 71 can be rotated easily. Therefore, it is possible to rotate the shift drum 71 smoothly and to execute speed shift quickly.

As explained above, according to the embodiment to which the present invention is applied, the transmission device 40 of the motorcycle 1 is arranged in the motorcycle 1, includes the transmission 41 and the actuator 72, the transmission 41 including the shift drum 71, the shift drum 71 rotating and changing shift position, the actuator 72 rotatively driving the shift drum 71, and controls the rotation angle of the shift drum 71 by restricting rotation of the shift drum 71 by cogging torque of the actuator 72, and the pattern of an output of the actuator 72 in changing the shift position by one stage is variable.

According to this configuration, since the pattern of an output of the actuator 72 is variable while employing the structure of the shift drum 71 having a single shape, the pattern of rotation of the shift drum 71 can be changed only by changing the pattern of the output of the actuator 72, and the characteristic of the speed shift of the transmission device 40 can be changed easily.

Further, the occupant can optionally change the pattern of an output of the actuator 72.

According to this configuration, the characteristic of the speed shift can be changed easily according to a request of the occupant.

Also, the shift drum 71 includes the first lead groove 71a, the second lead groove 71b, the third lead groove 71c, and the fourth lead groove 71d extending in the rotation direction of the shift drum 71, speed shift is executed by the shifters 74 to 77 which move along the first lead groove 71a, the second lead groove 71b, the third lead groove 71c, and the fourth lead groove 71d, the first lead groove 71a, the second lead groove 71b, the third lead groove 71c, and the fourth lead groove 71d include the intermediate positions allowing the shifters 74 to 77 to be positioned at a position different from that before speed shift and that after speed shift in changing the shift position by one stage, the first clutch 93 and the second clutch 94 are provided, the first clutch 93 switching transfer of power to a part of the plural shift positions, the second clutch 94 switching transfer of power to the other part of the plural shift positions, both of the shift positions before the speed shift and after the speed shift are established and power is transferred to the shift position before the speed shift by that one of the first clutch 93 and the second clutch 94 is connected at the intermediate position, and the actuator 72 has the first output pattern E1 and the second output pattern E2, the first output pattern E1 allowing rotation of the shift drum 71 to stop once at the intermediate position, the second output pattern E2 allowing the shift position to be changed by one stage skipping over the intermediate position.

According to this configuration, the characteristic of the speed shift can be changed easily by changing a way of rotating the shift drum 71 by the first output pattern E1 and the second output pattern E2. According to the first output pattern E1, the sound of the speed shift and the speed shift shock can be reduced. According to the second output pattern E2, the speed of the speed shift can be increased. The first output pattern E1 is selected when the motorcycle 1 makes cruising for example, and the second output pattern E2 is selected when the motorcycle 1 travels along a closed circuit for example.

Further, when the actuator 72 is to execute outputting by the second output pattern E2, a clutch corresponding to the shift position after the speed shift out of the first clutch 93 and the second clutch 94 is made to be in a connected state from start to finish of the speed shift in changing the shift position by one stage.

According to this configuration, drop of the driving force caused by disconnection of the clutch at the time of the speed shift can be prevented, and speed shift can be executed quickly.

Also, a clutch corresponding to the shift position before the speed shift out of the first clutch 93 and the second clutch 94 is disconnected in changing the shift position by one stage.

According to this configuration, since a clutch corresponding to the shift position before the speed shift is disconnected, the shift drum 71 can be rotated smoothly, and speed shift can be executed smoothly by the second output pattern E2.

Also, the embodiment described above shows one aspect to which the present invention is applied, and the present invention is not to be limited to the embodiment described above.

In the embodiment described above, the pattern of outputting of the actuator 72 is variable between a case of rotating the shift drum 71 stepwise by the actuator 72 at the time of changing the shift position by one stage and a case of rotating the shift drum 71 by one time, however, the present invention is not to be limited to it. For example, it is also possible to change the rotation speed and the duty ratio of the actuator 72 and to make the pattern of outputting of the actuator 72 variable.

Although explanation has been given exemplifying the transmission device 40 of the motorcycle 1 in the embodiment described above, the present invention is not to be limited to it, and the present invention is applicable to a transmission device of a three-wheeled vehicle including two front wheels or two rear wheels and a vehicle including four wheels or more.

REFERENCE SIGNS LIST

1 . . . Motorcycle (saddle riding vehicle)
40 . . . Transmission device
41 . . . Transmission
71 . . . Shift drum
71a . . . First lead groove (lead groove)
71b . . . Second lead groove (lead groove)
71c . . . Third lead groove (lead groove)
71d . . . Fourth lead groove (lead groove)
72 . . . Actuator
74 to 77 . . . Shifter
93 . . . First clutch
94 . . . Second clutch
E1 . . . First output pattern
E2 . . . Second output pattern

The invention claimed is:
1. A transmission device of a saddle riding vehicle, the transmission device being arranged in the saddle riding vehicle, comprising a transmission and an actuator, the transmission including a shift drum, the shift drum rotating and changing shift position, the actuator rotatively driving the shift drum, and controlling a rotation angle of the shift drum by restricting rotation of the shift drum by cogging torque of the actuator, wherein a pattern of an output of the actuator in changing the shift position by one stage is variable.

2. The transmission device of the saddle riding vehicle according to claim 1, wherein an occupant can optionally change the pattern of the output of the actuator.

3. The transmission device of the saddle riding vehicle according to claim 1, wherein the shift drum includes lead grooves extending in a rotation direction of the shift drum, speed shift being executed by shifters, the shifters moving along the lead grooves, the lead grooves include intermediate positions allowing the shifters to be positioned at a position different from that before speed shift and that after speed shift in changing the shift position by one stage, a first clutch and a second clutch are provided, the first clutch switching transfer of power to a part of a plurality of the shift positions, the second clutch switching transfer of power to the other part of the plurality of the shift positions, both of the shift positions before the speed shift and after the speed shift are established and power is transferred to the shift position before the speed shift by that one of the first clutch and the second clutch is connected at the intermediate position, and the actuator has a first output pattern and a second output pattern, the first output pattern allowing rotation of the shift drum to stop once at the intermediate position, the second output pattern allowing the shift position to be changed by one stage skipping over the intermediate position.

4. The transmission device of the saddle riding vehicle according to claim 3, wherein when the actuator is to execute outputting by the second output pattern, a clutch corresponding to the shift position after the speed shift out of the first clutch and the second clutch is made to be in a connected state from start to finish of speed shift in changing the shift position by one stage.

5. The transmission device of the saddle riding vehicle according to claim 4, wherein a clutch corresponding to the shift position before the speed shift out of the first clutch and the second clutch is disconnected in changing the shift position by one stage.

* * * * *